US011579276B2

(12) United States Patent
Namioka et al.

(10) Patent No.: US 11,579,276 B2
(45) Date of Patent: Feb. 14, 2023

(54) INFORMATION COLLECTION SYSTEM AND INFORMATION COLLECTION METHOD

(71) Applicant: Kabushiki Kaisha Toshiba, Tokyo (JP)

(72) Inventors: Yasuo Namioka, Tokyo (JP); Nobuaki Takahashi, Kamakura (JP); Koichi Yamagata, Kamakura (JP); Atsushi Wada, Yokohama (JP); Keisuke Nogami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 300 days.

(21) Appl. No.: 16/875,434

(22) Filed: May 15, 2020

(65) Prior Publication Data

US 2020/0278434 A1    Sep. 3, 2020

Related U.S. Application Data

(62) Division of application No. 15/227,445, filed on Aug. 3, 2016, now Pat. No. 10,698,093.

(51) Int. Cl.
*G01S 11/06* (2006.01)
*G01S 1/02* (2010.01)
(Continued)

(52) U.S. Cl.
CPC ........... *G01S 11/06* (2013.01); *G01S 1/02* (2013.01); *G01S 5/0221* (2013.01);
(Continued)

(58) Field of Classification Search
CPC .......... G01S 5/0278; G01S 5/14; G01S 11/06; G06Q 10/063114; G06Q 50/04
See application file for complete search history.

(56) References Cited

U.S. PATENT DOCUMENTS 8,659,429 B1 * 2/2014 Wagner ............... G01S 5/14
340/572.1
2005/0206555 A1 9/2005 Bridgelall
(Continued)

FOREIGN PATENT DOCUMENTS

JP    H04-295787 A    10/1992
JP    2008-224489 A   9/2008
(Continued)

OTHER PUBLICATIONS

L. Babai, Finite Markov Chains, https://www.classes.cs.uchicago.edu/archive/2005/fall/27100-1/Markov.pdf, p. 85-95, 2003 (Year: 2003).*

(Continued)

*Primary Examiner* — Bernarr E Gregory
*Assistant Examiner* — Fred H Mull
(74) *Attorney, Agent, or Firm* — Oblon, McClelland, Maier & Neustadt, L.L.P.

(57) ABSTRACT

According to one embodiment, an information collection system comprises a transmitter, a receiver, and a processor. The transmitter emits a signal. The receiver receives the signal. The processor calculates a distance between the transmitter and the receiver from a strength of the signal received by the receiver. The processor calculating the distance between the transmitter and the receiver from the strength of the signal for each of the signals received during a first interval, and using an average distance as the distance (Continued)

between the transmitter and the receiver, the average distance being obtained by averaging the plurality of calculated distances.

5 Claims, 13 Drawing Sheets

(51) Int. Cl.
*G06Q 10/06* (2012.01)
*G01S 5/02* (2010.01)
*G06Q 50/04* (2012.01)
*G01S 5/14* (2006.01)
*G01S 11/02* (2010.01)
*G06Q 10/0631* (2023.01)

(52) U.S. Cl.
CPC .............. *G01S 5/0278* (2013.01); *G01S 5/14* (2013.01); *G01S 11/02* (2013.01); *G06Q 10/063114* (2013.01); *G06Q 50/04* (2013.01)

(56) References Cited

U.S. PATENT DOCUMENTS

| | | | |
|---|---|---|---|
| 2009/0326807 A1 | 12/2009 | Ramaswamy | |
| 2013/0288692 A1 | 10/2013 | Dupray | |
| 2014/0330604 A1* | 11/2014 | Connolly | ....... G06Q 10/063114 705/7.15 |

FOREIGN PATENT DOCUMENTS

| | | |
|---|---|---|
| JP | 2011-185762 | 9/2011 |
| JP | 2012-212953 A | 11/2012 |
| JP | 2013-54703 A | 3/2013 |
| JP | 2014-215134 A | 10/2014 |

OTHER PUBLICATIONS

Akihiro Uehara, "iBeacon handbook," (Japanese Edition), Mar. 15, 2014, Bibliographic Information Only (Year: 2014).
Application 1522445_USPTO Subject Matter Eligibility Examples 37 to 42 (Year: 2019).

* cited by examiner

INFORMATION COLLECTION SYSTEM AND INFORMATION COLLECTION METHOD

CROSS-REFERENCE TO RELATED APPLICATIONS

This application is a divisional application of U.S. application Ser. No. 15/227,445, filed Aug. 3, 2016, and is based upon and claims the benefit of priority from Japanese Patent Application No. 2015-153596, filed on Aug. 3, 2015 and Japanese Patent Application No. 2016-119086, filed on Jun. 15, 2016. The entire contents of all of the above-listed documents are incorporated herein by reference.

FIELD

Embodiments described herein relate generally to an information collection system and an information collection method.

BACKGROUND

Conventionally, in a production site, it has been necessary for an operator to perform an input operation into an information system to obtain the information of what operation has been performed by the operator and where the operation has been performed. To reduce such a burden, methods are being investigated to collect the information automatically by using a transmitter and a receiver that is capable of receiving a signal from the transmitter.

However, when the methods are used in a production site having many disturbances, etc., it is difficult for the receiver to receive the signal accurately.

DETAILED DESCRIPTION

Figure 1:
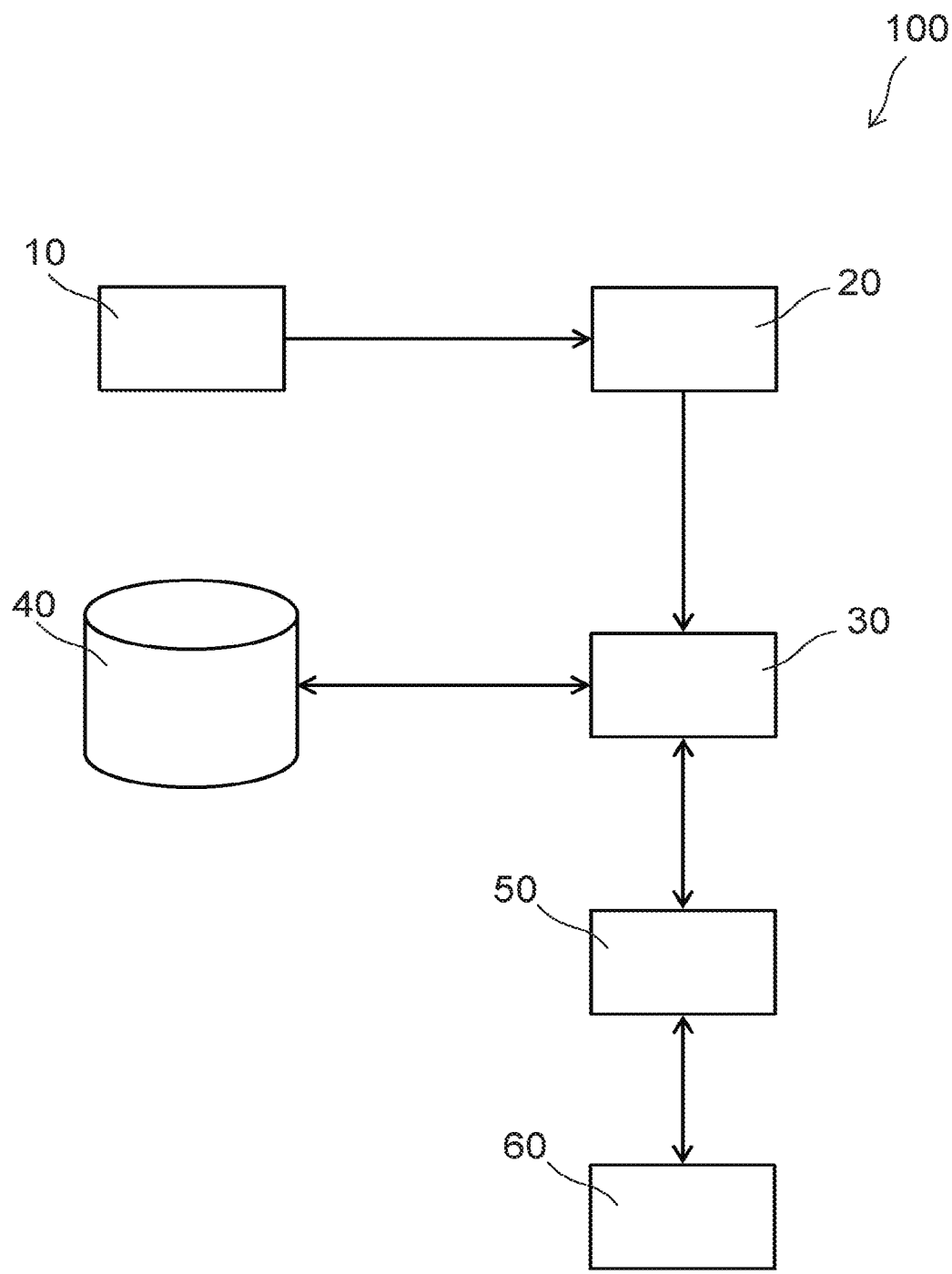
FIG. 1 is a schematic view showing an information collection system according to a first embodiment.

According to one embodiment, an information collection system comprises a transmitter, a receiver, and a processor (processing circuitry). The transmitter emits a signal. The receiver receives the signal. The processor calculates a distance between the transmitter and the receiver from a strength of the signal received by the receiver. The processor calculating the distance between the transmitter and the receiver from the strength of the signal for each of the signals received during a first interval, and using an average distance as the distance between the transmitter and the receiver, the average distance being obtained by averaging the plurality of calculated distances.

Embodiments of the invention will now be described with reference to the drawings.

In the drawings and the specification of the application, components similar to those described thereinabove are marked with like reference numerals, and a detailed description is omitted as appropriate.

First Embodiment

An information collection system according to a first embodiment will now be described using FIG. 1.

FIG. 1 is a schematic view showing an information collection system 100 according to the first embodiment.

As shown in FIG. 1, the information collection system 100 includes a transmitter 10, a receiver 20, a processor 30, a storage unit 40, a first display unit 50, and an input unit 60.

The transmitter 10 emits a signal including an ID of the transmitter 10. For example, the transmitter 10 is set to emit a signal every prescribed amount of time. The signal that is emitted from the transmitter 10 may be directional or may be nondirectional. For example, by mounting, to the transmitter 10, a parabolic reflector that is oriented in a desired direction, the signal strength in the desired direction can be larger than those of other directions. Or, by mounting a radio wave absorber that covers directions other than the desired direction, the signal strength in the desired direction can be larger than those of the other directions.

The receiver 20 receives the signal emitted from the transmitter 10. The receiver 20 is further capable of sensing the strength when the signal is received. The receiver 20 outputs the received signal toward the processor 30.

The processor 30 converts the signal input from the receiver 20 into information. Thereby, the information such as the ID of the transmitter 10, the reception time, etc., included in the signal emitted from the transmitter 10 is obtained. The processor 30 can calculate the distance between the transmitter 10 and the receiver 20 based on the signal strength as received by the receiver 20.

The storage unit 40 stores various information necessary for the processing of the processor 30. For example, in the case where the information collection system 100 is used in a production site, the storage unit 40 stores information such as the process flows of the production site, the processes included in the process flows, the apparatuses used in each process, the location where each process is executed, the operator that executes each process, the object processed by each process, etc.

The information that is included in the storage unit 40 includes information that is associated with the placement location of the transmitter 10. For example, in the example of the production site described above, information relating to the ID of the transmitter 10 mounted at the location is included for the location where the process is executed.

Therefore, the processor 30 can use the ID of the transmitter 10 input from the receiver 20 to extract, from the storage unit 40, the process, the processing object, the apparatus to be used, etc., that are associated with the ID.

The processor 30 outputs, toward the first display unit 50, the information obtained by the processing of the processor 30 and/or the information obtained by referring to the storage unit 40. The first display unit 50 causes a screen to display the information input from the processor 30.

At this time, a manager that views the first display unit 50 may use the input unit 60 to input information for the displayed information.

The transmitter 10 is, for example, a beacon, a RFID (Radio Frequency IDentifier), or the like provided at locations of the production site. Or, the transmitter 10 may be a beacon, a RFID, or the like that accompanies a processing material, a jig, or the like that is not fixed.

The receiver 20 is, for example, a tablet terminal or a smartphone that is capable of receiving the signal from the transmitter 10 via Bluetooth (registered trademark). In the case where the transmitter 10 is a RFID, the receiver 20 includes an RF reader. For example, the operator that executes the processes of the production site possesses the receiver 20.

In the example described above, it is also possible to interchange the object to which the transmitter 10 is distributed and the object to which the receiver 20 is distributed.

In other words, in the example described above, the operator may possess the transmitter 10. In such a case, the receivers 20 are provided at locations of the production site, manufacturing equipment, etc.

Or, the transmitters 10 may accompany the processing materials, the jigs, etc.; and the receivers 20 may be provided at locations of the production site, the manufacturing equipment, etc.

The processor 30 is, for example, a CPU that stores software.

The storage unit 40 is, for example, a hard disk. The storage unit 40 may be connected to the processor 30 via a network.

The first display unit 50 is, for example, a liquid crystal display such as a smartphone, a tablet, a PC, etc.

The input unit 60 is, for example, a keyboard or a touch panel of a smartphone, a tablet, etc.

A program that is executed by the information collection system 100 will now be described using FIG. 2 and FIG. 3.

Figure 2:
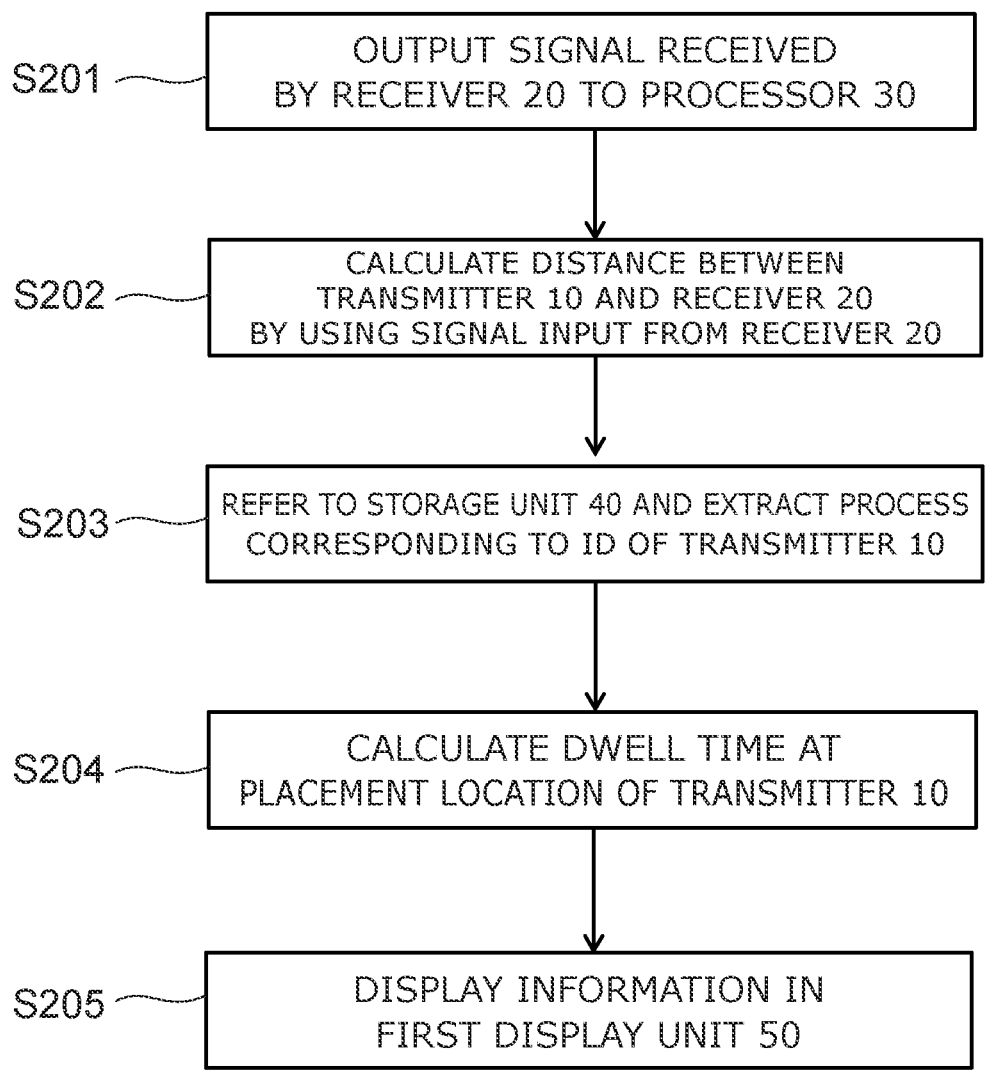
FIG. 2 is a flowchart of the program executed by the information collection system according to the first embodiment.

FIG. 2 is a flowchart of the program executed by the information collection system 100 according to the first embodiment.

Figure 3:
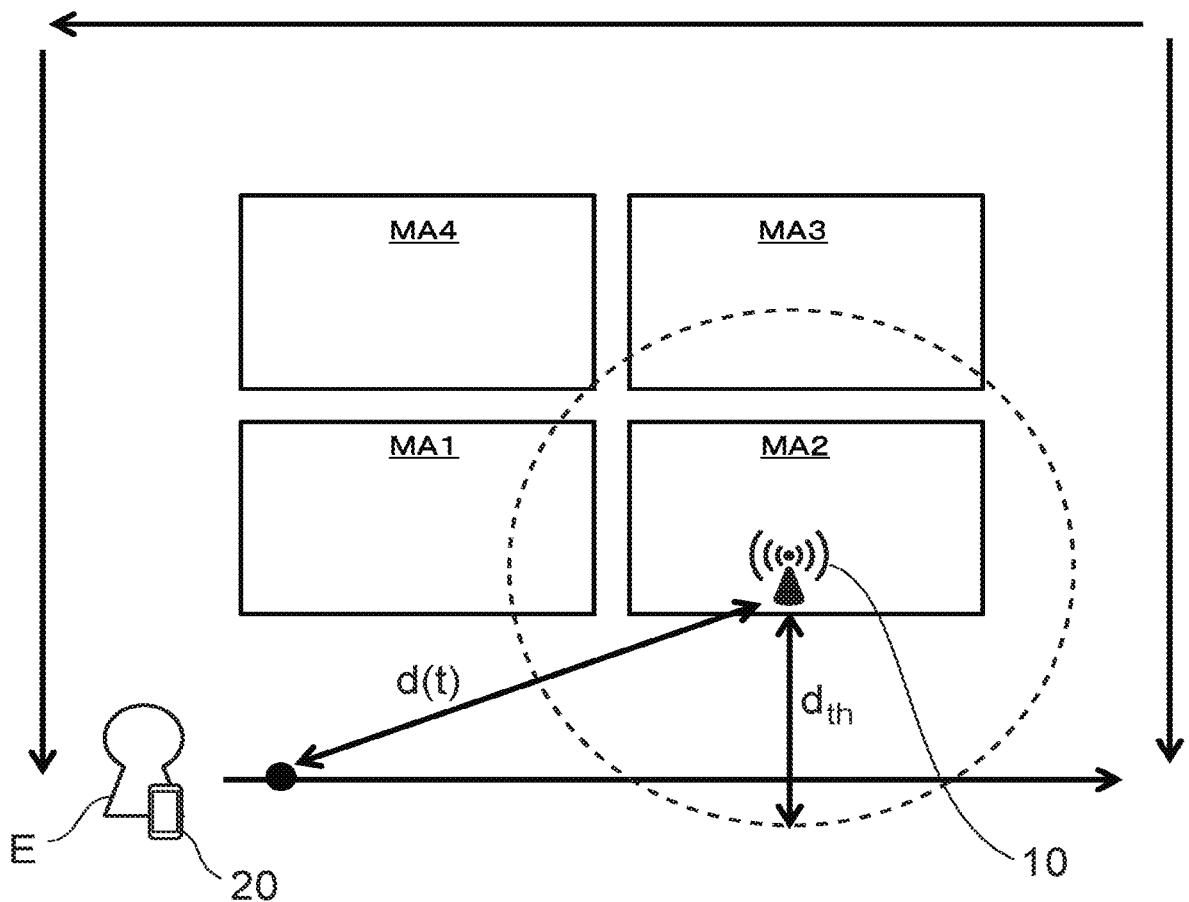
FIG. 3 is a schematic view showing an example of the production site in which the information collection system according to the first embodiment is used.

FIG. 3 is a schematic view showing an example of the production site in which the information collection system 100 according to the first embodiment is used.

Multiple manufacturing apparatuses MA1 to MA4 are provided in the production site according to an example shown in FIG. 3. Among the manufacturing apparatuses MA1 to MA4, the transmitter 10 is mounted to the manufacturing apparatus MA2. An operator E carries the receiver 20 and goes around the manufacturing apparatuses MA1 to MA4.

As shown in FIG. 3, when the operator E carries the receiver 20 and moves, a radio wave is received by the receiver 20 when the operator E enters within range of the radio wave emitted from the transmitter 10. At this time, in step S201, the receiver 20 outputs, toward the processor 30, the signal received from the transmitter 10. The transmitter 10 transmits a signal every prescribed amount of time. For example, the receiver 20 outputs the signal toward the processor 30 each time the signal is received.

Then, in step S202, the processor 30 calculates a distance d between the transmitter 10 and the receiver 20 from the strength of the signal received by the receiver 20.

Specifically, the processor 30 calculates the distance d between the transmitter 10 and the receiver 20 for each of x signals received before a time $t_0$. Then, the processor 30 sets a reference time $st_0$ based on the time $t_0$. The processor 30 extracts the shortest distance d of the calculated multiple distances d. The processor 30 uses the shortest distance d as a reference distance $sd(t_0)$ between the transmitter 10 and the receiver 20 at the reference time $st_0$. The processor 30 uses the reference distance $sd(t)$ as the distance between the transmitter 10 and the receiver 20 at the reference time st. The time t may be set as-is as the reference time st. Or, a time obtained by performing a prescribed calculation on the time t may be set.

The processor 30 repeatedly executes step S202 for other times as well. In other words, the processor 30 determines reference distances $sd(t_1)$, $sd(t_2)$, . . . , $sd(t_i)$ between the transmitter 10 and the receiver 20 corresponding respectively to reference times $st_1$, $st_2$, . . . $st_i$ for times $t_1$, $t_2$, . . . $t_i$ after the time $t_0$.

Then, in step S203, the processor 30 refers to the storage unit 40 and extracts the information relating to the process, apparatus, processing object, etc., corresponding to the ID of the transmitter 10.

Continuing in step S204, the processor 30 calculates the dwell time of the possessor of the receiver 20 at the location where the transmitter 10 is mounted by using the multiple reference distances $sd(t_1)$, $sd(t_2)$, . . . , $sd(t_i)$ calculated in step S202.

Specifically, the method for calculating the dwell time is described below.

The processor 30 pre-stores a threshold $d_{th}$ for the reference distance $sd_t$ for calculating the dwell time. The processor 30 determines a first reference time when the calculated reference distance $sd(t)$ initially became the threshold $d_{th}$ or less. The processor 30 further determines a second reference time when the calculated reference distance $sd(t)$ exceeds the threshold $d_{th}$ after becoming the threshold $d_{th}$ or less. The processor 30 calculates the difference between the first reference time and the second reference time as the dwell time. The manager may preset the threshold $d_{th}$ for the reference distance sd.

Steps S202 to S204 will now be described with reference to FIG. 3. When the operator E that carries the receiver 20 moves from the manufacturing apparatus MA1 toward the manufacturing apparatus MA2, the calculated reference distance sd(t) becomes shorter with the movement of the operator E. When the reference distance sd(t) becomes short and becomes the threshold $d_{th}$ or less, the reference time of the reference distance sd(t) is stored in the processor 30.

Subsequently, when the operator E moves in a direction away from the manufacturing apparatus MA2, the calculated reference distance sd(t) becomes longer with the movement of the operator E. When the reference distance sd(t) exceeds the threshold $d_{th}$, the reference time of the reference distance sd(t) is stored in the processor 30. The processor 30 calculates the dwell time at the manufacturing apparatus MA2 from the difference from the reference time when the reference distance sd(t) became the threshold $d_{th}$ or less.

The case is described in FIG. 3 where the transmitter 10 is mounted to the manufacturing apparatus, and the operator E carries the receiver 20. The transmitter 10 may be mounted to a processing material, etc., instead of the manufacturing apparatus. In the case where the transmitter 10 is mounted to a processing material, it is also possible to treat the dwell time calculated in step S204 as handling time. The handling time is the time that the operator E performs an operation on the processing material such as transferring, processing, etc. In such a case, the processor 30 may record, as the acquisition location of the processing material, the process, the apparatus, the warehouse, etc., where the transmitter 10 dwelled at the first reference time when the calculated reference distance initially became the threshold or less. The processor 30 may record, as the location where the processing material is placed, the process, the apparatus, the warehouse, etc., where the transmitter 10 dwelled at the second reference time when the calculated reference distance exceeded the threshold.

Then, in step S205, the processor 30 causes the first display unit 50 to display the information of the extracted process, apparatus, processing object, etc., and the dwell time (in the case of the processing material, the handling time).

The processor 30 may further refer to the process flow including the process stored in the storage unit 40, and may calculate and cause the first display unit 50 to display the progress rate of the process flow, etc.

Operations and effects of the information collection system 100 according to the first embodiment described above will now be described.

According to the first embodiment, after the signal that is emitted from the transmitter 10 is received a prescribed number of times by the receiver 20, the processor 30 determines the shortest distance among the distances. Then, the processor 30 uses the distance as the distance between the transmitter 10 and the receiver 20 at the reference time.

Therefore, the precision of the distance between the transmitter 10 and the receiver 20 can be increased even in the case where the transmitter 10 and the receiver 20 are used in an environment in which the noise is large compared to the signal emitted from the transmitter 10.

In particular, in the case where the transmitter 10 and the receiver 20 are used in the interior of a building, there is a possibility that the signal emitted from the transmitter 10 may reach the receiver 20 after being reflected by an interior wall of the building, etc. When a signal that is reflected by an interior wall or the like is received by the receiver 20, there is a possibility that the distance between the transmitter 10 and the receiver 20 may be undesirably calculated as being longer than the actual distance.

Conversely, in the embodiment, the shortest distance of the calculated multiple distances is used as the distance between the transmitter 10 and the receiver 20. Thereby, it is possible to determine the distance between the transmitter 10 and the receiver 20 more accurately.

Accordingly, the invention according to the embodiment is particularly useful in the case where the transmitter 10 and the receiver 20 are used in the interior of the building.

According to the embodiment, the dwell time of the receiver 20 at the location where the transmitter 10 is provided is calculated using the distance obtained by the method described above. Therefore, the precision of the dwell time also can be increased.

Or, according to the embodiment, the handling time and the acquisition location and placement location of the processing material can be determined more accurately. Therefore, it is also possible to increase the precision of the inventory in the warehouse, the inventory at each process, the location, etc., of the processing material.

For example, by using the embodiment described above for a production site, etc., it is possible to reduce the effort of the input of the information of the operator. It is also possible to automatically record/control whether the operator dwells at the prescribed location as scheduled, etc.

The case is described in the example of the information collection system according to the first embodiment described above where the information collection system includes one transmitter 10 and one receiver 20. However, the information collection system according to the embodiment is not limited to the example. The information collection system according to the embodiment may include multiple transmitters 10 and multiple receivers 20. In such a case, the processor 30 performs steps S201 to S205 described above between each of the transmitters 10 and each of the receivers 20.

A case will now be described where the information collection system includes the multiple transmitters 10 and the multiple receivers 20. In such a case, for example, the multiple transmitters 10 are respectively provided at positions in the production site that are to be discriminated from each other; and multiple operators each possess the receiver 20.

Or, the transmitters 10 may be provided by providing the multiple transmitters 10 respectively at mutually-different manufacturing equipment. Or, a portion of the multiple transmitters 10 may be provided at locations of the production site; and another portion of the multiple transmitters 10 may be provided at the manufacturing equipment.

Similarly, the multiple receivers 20 may respectively accompany mutually-different processing materials, jigs, etc. Or, a portion of the multiple receivers 20 may be possessed by the operators; and the other portion of the multiple receivers 20 may accompany the processing materials, the jigs, etc.

In these examples, it is also possible to interchange the object to which the transmitter 10 is distributed and the object to which the receiver 20 is distributed.

Modification

In the information collection system 100 according to the first embodiment, it is also possible to determine the distance between the transmitter 10 and the receiver 20 by using the following method. This method is described using FIG. 4 to FIG. 6.

Figure 4:
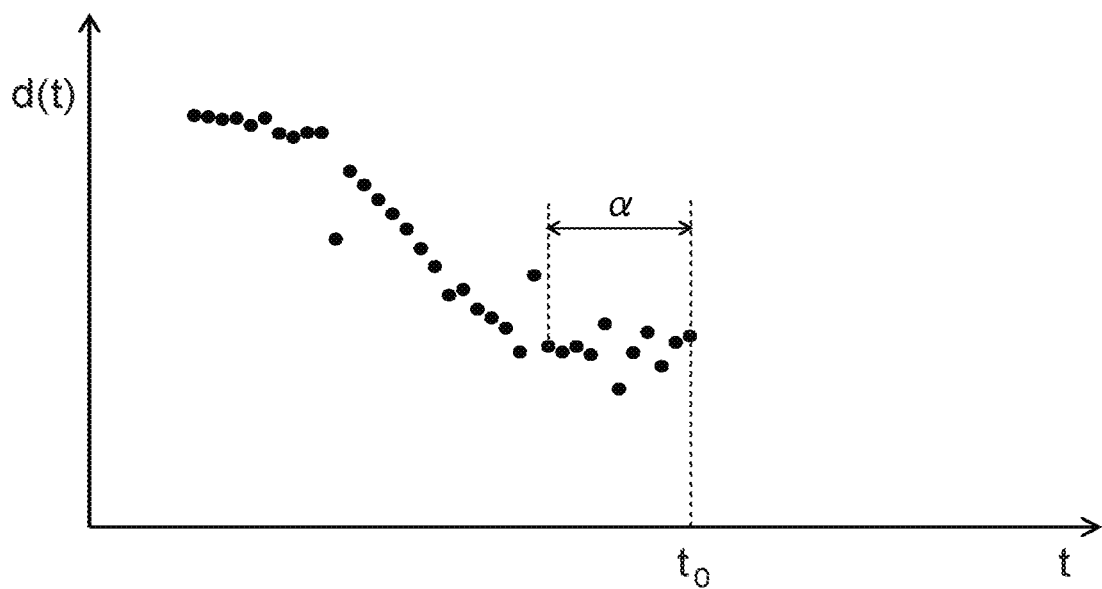
FIG. 4 is a schematic view showing an example of the time and the distance calculated from the strength of the received signal of the receiver at each time.
Figure 6:
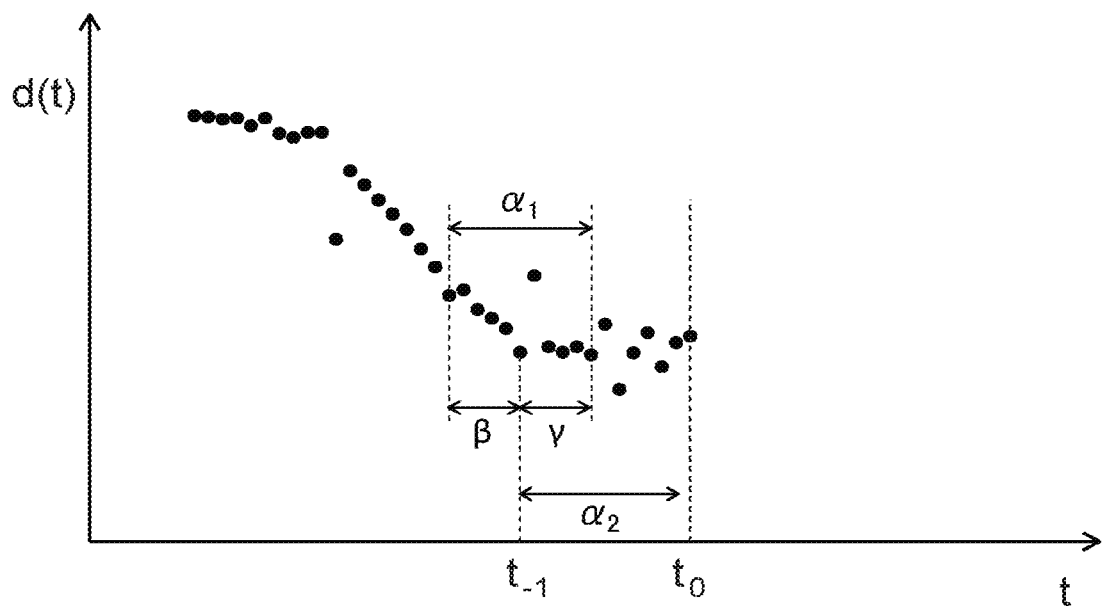
FIG. 6 is a schematic view showing an example of the time and the distance calculated from the strength of the received signal of the receiver at each time.

FIG. 4 and FIG. 6 are schematic views showing examples of the time and the distance calculated from the strength of the received signal of the receiver 20 at each time.

Figure 5:
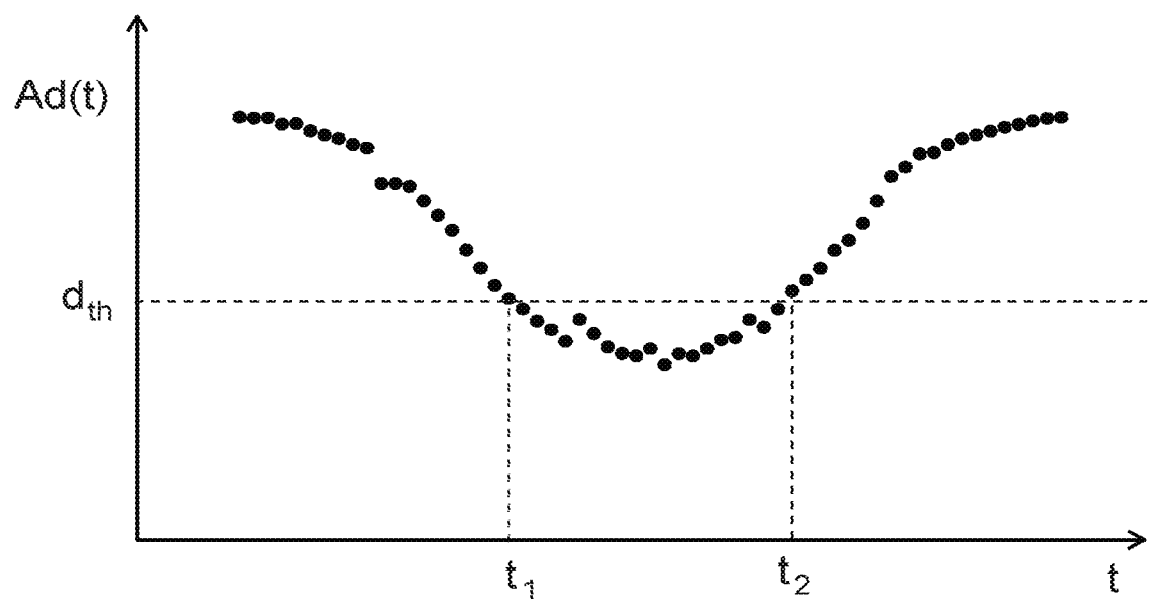
FIG. 5 is a schematic view showing the relationship between the time and the average distance at each time.

FIG. 5 is a schematic view showing the relationship between the time and the average distance at each time.

The flowchart of the method is similar to that of FIG. 2. In other words, in step S201, the receiver 20 outputs, toward the processor 30, the signal received from the transmitter 10.

However, the method for calculating the distance between the transmitter 10 and the receiver 20 in steps S202 and S204 differ from the method described above.

FIG. 4 shows an example of the distance d(t) calculated based on the signal strength received by the receiver 20 up to the time $t_0$.

In step S202, the processor 30 selects the multiple distances calculated during a first interval α using the time t as the reference, and calculates the average distance Ad(t) of the multiple distances. As one more specific example, as shown in FIG. 4, the processor 30 calculates the average distance $Ad(t_0)$ by averaging the distances $d(t_{0-\alpha})$ to $d(t_0)$ calculated between a time $t_0$, and the time $t_0$. Then, the processor 30 uses the average distance $Ad(t_0)$ as the distance between the transmitter 10 and the receiver 20 at the time $t_0$.

The processor 30 calculates the average distance Ad(t) at each time t by performing a similar calculation for the other times t.

FIG. 5 shows an example of the result of calculating the distance d(t) for the time $t_1$ of FIG. 4 and subsequent times and calculating the average distance Ad(t) at each time.

The average distance Ad(t) at each time is calculated in step S202 as shown in FIG. 5.

In the subsequent step S204, the processor 30 determines the time $t_1$ when the average distance Ad(t) initially became the threshold $d_{th}$ or less and the time $t_2$ when the average distance Ad(t) exceeded the threshold $d_{th}$ after becoming the threshold $d_{th}$ or less shown in FIG. 5. The processor 30 calculates a time difference $t_2-t_1$. Then, the processor 30 uses the time difference as the dwell time of the operator E (the receiver 20) at the location where the transmitter 10 is provided.

In the case where the transmitter 10 is mounted in a production site having many disturbances, etc., the strength of the received signal may fluctuate greatly due to the disturbances. If the distance that is calculated from a received signal including such noise is used as-is as the distance between the transmitter 10 and the receiver 20, the distance may instantaneously fall below or exceed the threshold. As a result, there is a possibility that the operator E may be determined to dwell even though the operator E actually is not proximal to the transmitter 10. Or, there is a possibility that it may be determined that the operator E has moved away from the transmitter 10 even though the operator E dwells proximally to the transmitter 10.

For this aspect, the effects of instantaneous fluctuations of d(t) caused by disturbances are relaxed as shown in FIG. 5 by using the average distance Ad(t) as the distance between the transmitter 10 and the receiver 20 at the time t. Therefore, it is possible to more accurately determine the dwell time of the operator E at the location where the transmitter 10 is provided.

The following methods may be used if the transmitter 10 and the receiver 20 are used in an environment in which the noise is so large that the noise cannot be relaxed sufficiently even by using the average of the distance. By using at least one of these methods, the signal that includes the large noise can be removed when calculating the average distance $Ad(t_0)$ of the time $t_0$.

In the first method, the processor 30 determines a standard deviation σ of the distances simultaneously with calculating the average distance $Ad(t_0)$ of the time $t_0$. The processor 30 determines the average distance $Ad(t_0)$ by using the distances remaining after removing the distances outside $Ad(t_0)$ ±nσ. The operator may appropriately set n.

In the second method, when determining the average distance $Ad(t_0)$ of the time $t_0$, the processor 30 uses a specified value DV and the average distance $Ad(t_{-1})$ of the time once previous. The specified value DV is a value set by considering the movement velocity of the operator carrying the receiver 20.

The processor 30 removes the values of the multiple distances that are calculated during the first interval α using the time $t_0$ as the reference and are outside $Ad(t_{-1})$±DV. The processor 30 determines the average distance $Ad(t_0)$ of the time $t_0$ by averaging the remaining values.

In the third method, at least one of an upper limit $d_{MAX}$ or a lower limit $d_{min}$ of the distance between the operator and the manufacturing apparatus is set beforehand. The processor 30 removes the distances outside this range and determines the average distance Ad(t) using the remaining distances.

In the example shown in FIG. 4, the time $t_0$ is used as the reference; and by using the first interval α before the time $t_0$, the average distance $Ad(t_0)$ is calculated by using the distances $d(t_{0-\alpha})$ to $d(t_0)$ calculated during the first interval α.

The first interval α may be an interval that includes a time in the future of the time used as the reference. An example of such a case is shown in FIG. 6.

When calculating the average distance, as shown in FIG. 6, the multiple distances that are calculated during a first interval $\alpha_1$ using the time $t_{-1}$ as the reference may be used. Specifically, the processor 30 calculates the average distance $Ad(t_{-1})$ of the distances $d(t_{-1-\beta})$ to $d(t_{-1+\gamma})$ calculated between the time which is an interval β before the time and the time which is an interval γ in the future of the time $t_{-1}$. The processor 30 uses the average distance $Ad(t_{-1})$ as the distance between the transmitter 10 and the receiver 20 at the time $t_{-1}$. The time is the time that is a second interval $\alpha_2$ before the time $t_0$ ($\alpha_2 > \gamma$). The average distance is calculated using, as the reference, the time that is the second interval $\alpha_2$ before the time $t_0$ because the data in the future of the time $t_0$ does not exist at the point in time of the time $t_0$.

For example, the intervals β and γ each may be set to $\alpha_1/2$.

Thus, when calculating the average distance Ad(t) of the time t that is used as the reference, the distance between the transmitter 10 and the receiver 20 can be determined more accurately by using distances in the future with respect to the time t.

To improve the accuracy further, it is desirable to adjust the first interval $\alpha_1$ according to the movement of the operator E carrying the receiver 20. For example, when the operator E moves slowly, the actual distance between the transmitter 10 and the receiver 20 substantially does not change even in the case where the first interval $\alpha_1$ is long. In such a case, problems of the accuracy of the measurement result do not occur easily. However, in the case where the first interval $\alpha_1$ is long and the operator E moves quickly, for example, the distance is undesirably averaged for the entire interval from when the operator E approaches the transmitter 10, dwells at the transmitter 10, and moves away from the transmitter 10. Accordingly, it is difficult to accurately determine the distance between the transmitter 10 and the receiver 20.

It is possible to determine the distance between the transmitter 10 and the receiver 20 more accurately by shortening the first interval $\alpha_1$ as the movement of the operator E quickens. As an example of such a method, a receiver 20 that can sense the acceleration may be used; and the acceleration that is sensed by the receiver 20 may be utilized. More specifically, the receiver 20 senses the acceleration A(t) at the time t. The processor 30 calculates a velocity V(t) of the receiver 20 (the operator E) from the acceleration A(t). Then, the processor 30 calculates the average distance Ad(t) by shortening the first interval $\alpha_1$ as the velocity V(t) quickens.

It is also possible to remove (exclude from the calculation of the average distance Ad(t)) data including large noise by using the acceleration A(t). For example, the distance $d(t_1)$ is removed as including large noise when the velocity V(t) is a prescribed threshold $V_{th}$ or less and the difference between the distance $d(t_1)$ and the distance $d(t_0)$ calculated directly before the distance $d(t_1)$ is the prescribed threshold $d_{th}$ or more. Thereby, it is possible to determine the distance between the transmitter 10 and the receiver 20 more accurately.

Other than using the velocity V(t) as the method for removing the data including large noise, a method may be used in which the average and/or variation of the acceleration A(t) during a prescribed interval is compared to a prescribed threshold.

Or, the period of the change of the acceleration may be utilized. Generally, when a human substantially does not move, the wavelength of the acceleration A(t) is short; and the period is long. Then, when the human moves, the wavelength of the acceleration A(t) lengthens; and the period becomes short. By utilizing this aspect, the data that includes noise may be removed by comparing the wavelength of the period of the acceleration A(t) to a prescribed threshold and by using the comparison result.

Or, the amplitude of the acceleration may be utilized. Generally, when a human substantially does not move, the amplitude of the acceleration A(t) is small; and when the human moves, the amplitude of the acceleration A(t) is large. By utilizing this aspect, the data that includes noise may be removed by comparing the amplitude of the acceleration A(t) to a prescribed threshold and by using the comparison result.

In the example described above, it is also possible to interchange the object to which the transmitter 10 is distributed and the object to which the receiver 20 is distributed. In that case, the transmitter 10 may be able to sense the acceleration A(t) and the processor 30 may be able to remove data including large noise by utilizing the acceleration A(t).

Second Embodiment

An information collection system 200 according to a second embodiment will now be described using FIG. 7 and FIG. 8.

Figure 7:
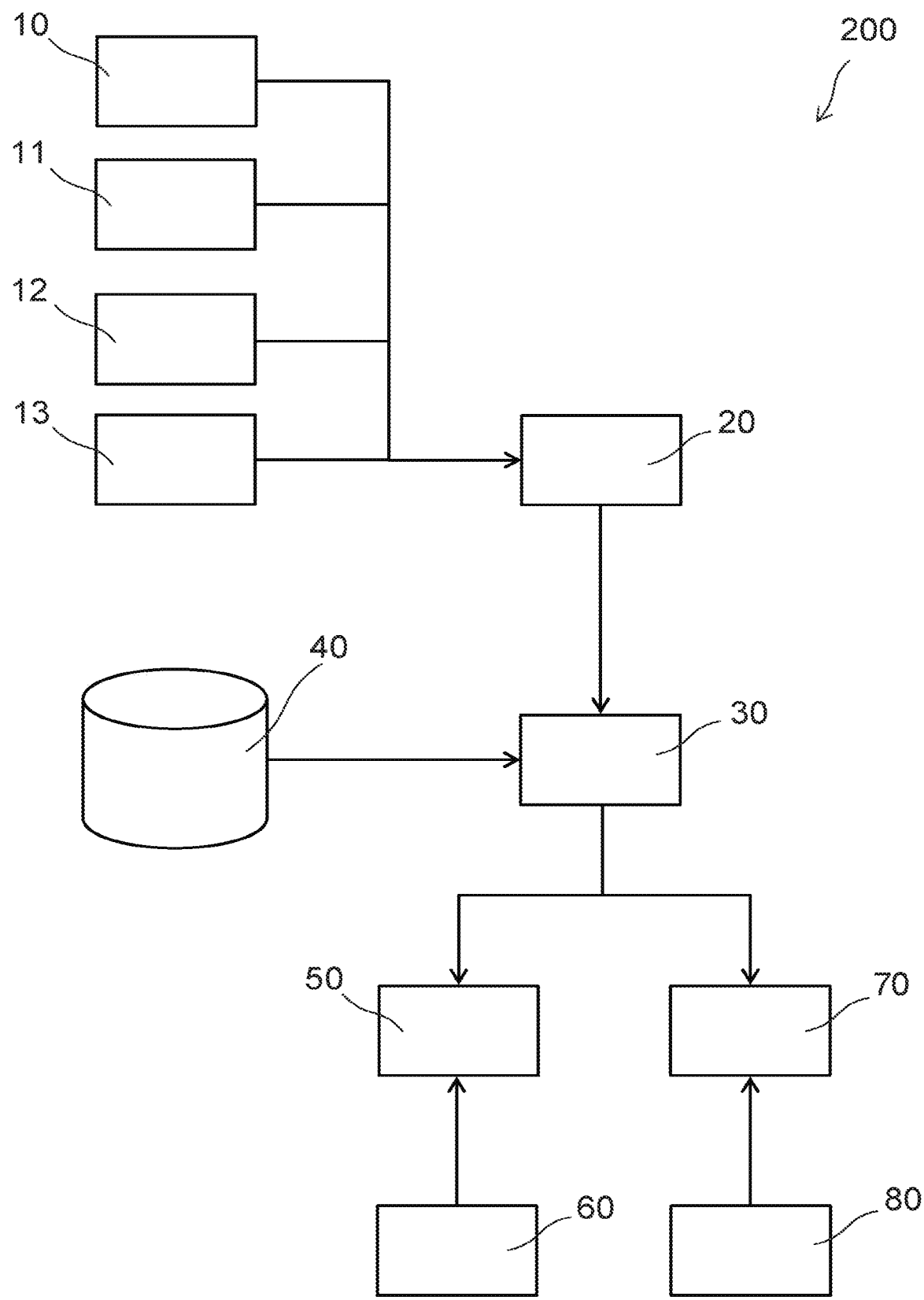
FIG. 7 is a schematic view showing the information collection system according to a second embodiment.

FIG. 7 is a schematic view showing the information collection system 200 according to the second embodiment.

Figure 8:
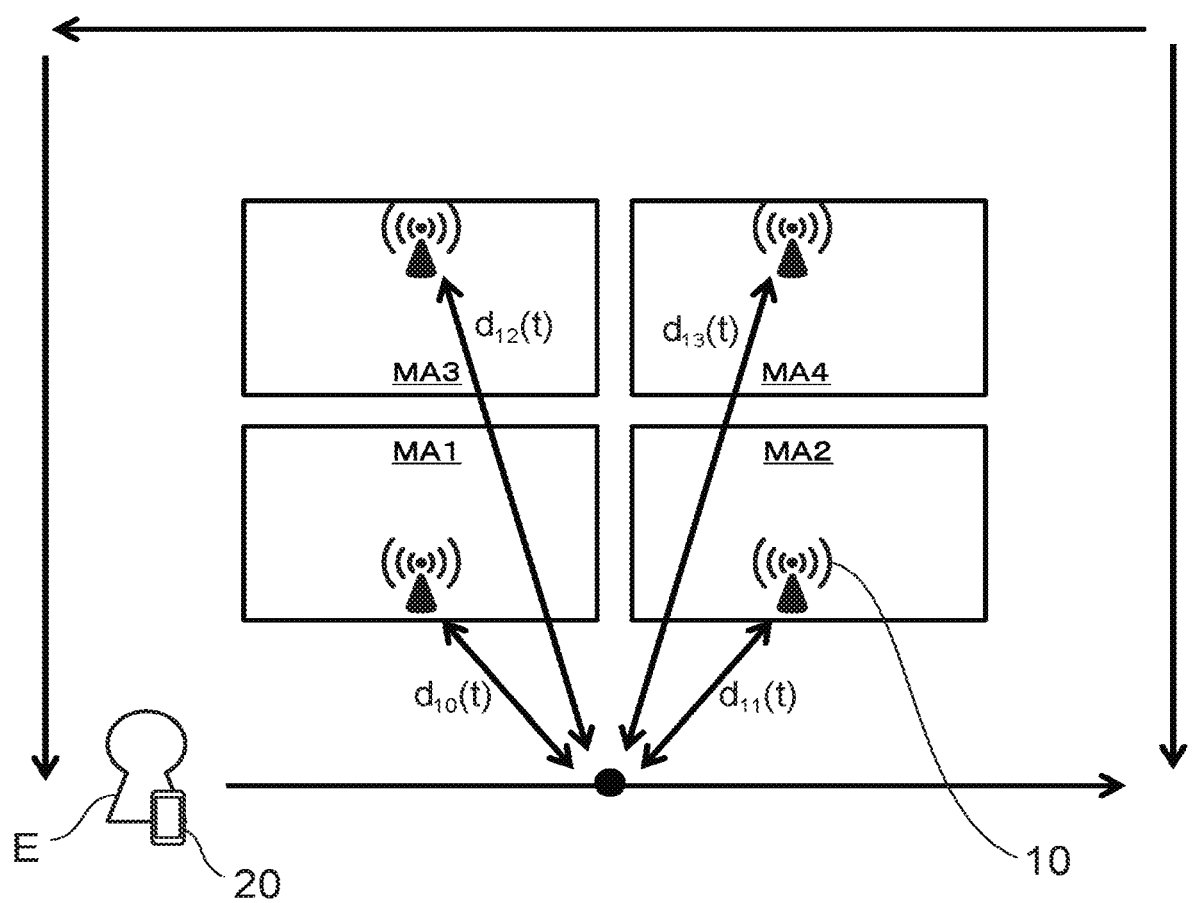
FIG. 8 is a schematic view showing an example of a production site in which the information collection system according to the second embodiment is used.

FIG. 8 is a schematic view showing an example of a production site in which the information collection system 200 according to the second embodiment is used.

Compared to the information collection system 100, the information collection system 200 according to the second embodiment further includes multiple transmitters 11 to 13, a second display unit 70, and an input unit 80 as shown in FIG. 7.

The information collection system 200 may include more transmitters in addition to the transmitters 10 to 13 shown in FIG. 7.

In the production site according to the example shown in FIG. 8, the multiple manufacturing apparatuses MA1 to MA4 are provided; and the transmitters 10 to 13 are mounted respectively to the multiple manufacturing apparatuses MA1 to MA4. The operator E carries the receiver 20 and goes around the manufacturing apparatuses MA1 to MA4.

The second display unit 70 is, for example, a liquid crystal display included in a tablet, etc. The input unit 80 is, for example, a touch panel included in the tablet.

For example, the operator carries the second display unit 70 and the input unit 80 inside the production site.

A program that is executed by the information collection system 200 will now be described using FIG. 9.

Figure 9:
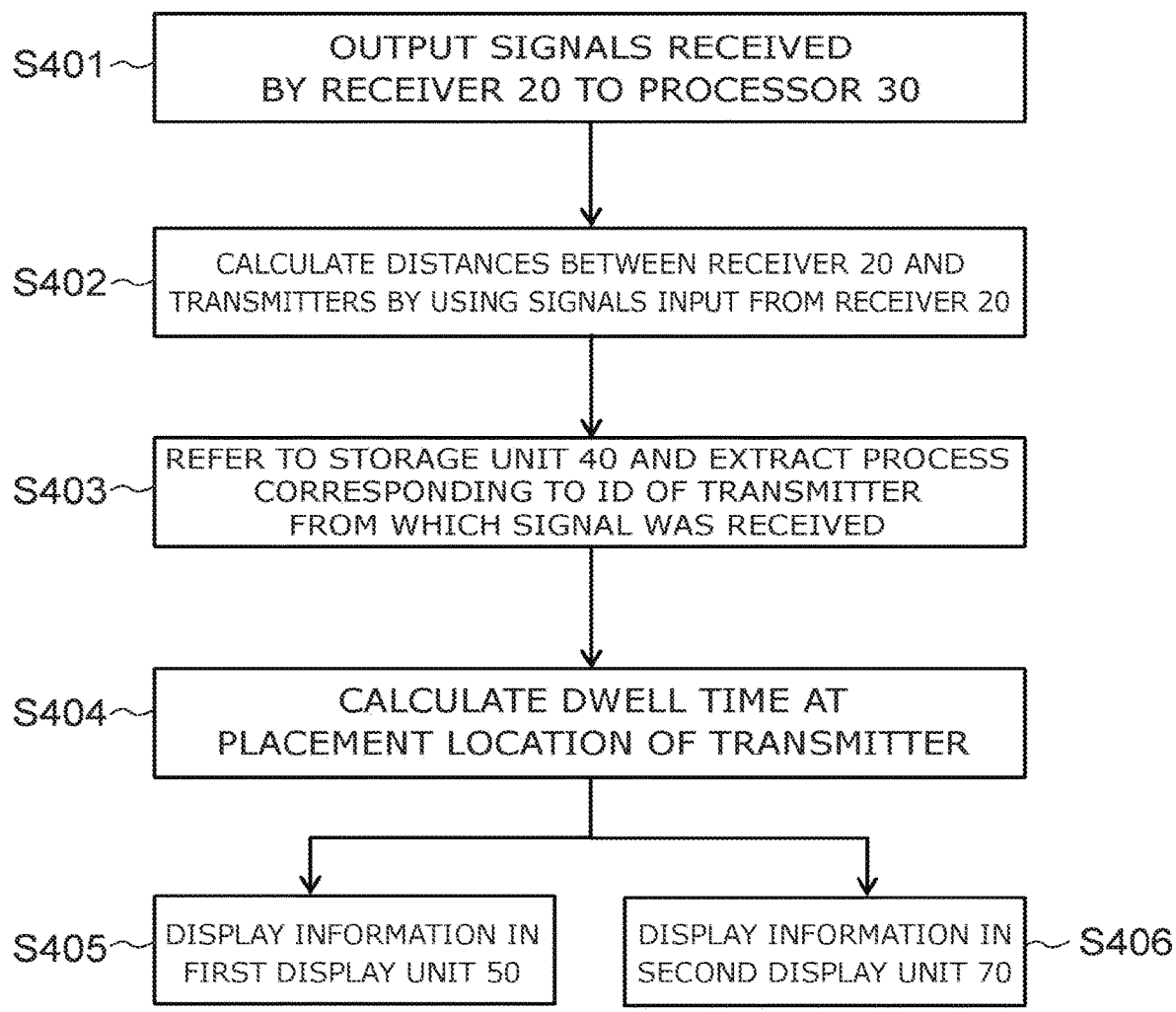
FIG. 9 is a flowchart of the program executed by the information collection system according to the second embodiment.

FIG. 9 is a flowchart of the program executed by the information collection system 200 according to the second embodiment.

First, the receiver 20 receives the signals emitted from the transmitters 10 to 13. It is unnecessary for the receiver 20 to constantly receive the signals from all of the transmitters 10 to 13. It is sufficient for the receiver 20 to be able to receive the signal from at least one transmitter of the transmitters 10 to 13 positioned proximally to the receiver 20 when the operator E goes around the manufacturing apparatuses MA1 to MA4 where the transmitters 10 to 13 are mounted.

When the receiver 20 receives the signals, the receiver 20 outputs the received signals to the processor 30 in step S401.

Then, in step S402, the processor 30 calculates the distances between the receiver 20 and the transmitters from which the receiver 20 received the signals. The processor 30 calculates the reference distances at the reference time between the receiver 20 and the transmitters using a method similar to the method described in reference to step S202.

Namely, for example, when the receiver 20 receives the signals from the transmitters 10 to 13, the processor 30 calculates $d_{10}(t)$, $d_{11}(t)$, $d_{12}(t)$, and $d_{13}(t)$ of the time t. Then, $sd_{10}(t)$, $sd_{11}(t)$, $sd_{12}(t)$, and $sd_{13}(t)$ are calculated by a method similar to that of step S202 for the distances between the receiver 20 and the transmitters 10 to 13.

$d_{10}(t)$, $d_{11}(t)$, $d_{12}(t)$, and $d_{13}(t)$ respectively are the distances between the receiver 20 and the transmitters 10 to 13. $sd_{10}(t)$, $sd_{11}(t)$, $sd_{12}(t)$, and $sd_{13}(t)$ respectively are the reference distances between the receiver 20 and the transmitters 10 to 13.

The following step S403 may be performed similarly to step S203. Namely, the processor 30 refers to the storage unit 40 and extracts the information relating to the process, apparatus, processing object, etc., corresponding to the ID of the transmitter from which the signal is received.

In the case where the signals emitted from multiple transmitters are received by the receiver 20, the processor 30 may extract the information corresponding to the ID of each of the multiple transmitters.

Then, in step S404, the processor 30 calculates the dwell time of the possessor of the receiver 20 at the locations where the transmitters are mounted by using the multiple reference distances $sd_{10}(t)$, $sd_{11}(t)$, $sd_{12}(t)$, and $sd_{13}(t)$ calculated in step S402.

In the case where the receiver 20 receives the signals from the multiple transmitters, the processor 30 treats the operator as dwelling at the location where the transmitter of the multiple transmitters having the shortest reference distance to the receiver 20 exists. In other words, the processor 30 calculates, as the dwell time, the time that the calculated reference distance is the threshold or less for the transmitter of the multiple transmitters having the shortest reference distance to the receiver 20.

In the case where the transmitter 10 is mounted to the processing material, the dwell time may be treated as the handling time of the processing material. In such a case, it is treated as if an operation is performed on the processing material at the location where the transmitter of the multiple transmitters having the shortest reference distance to the receiver 20 exists. In other words, in such a case, the processor 30 calculates, as the handling time of the processing material, the time that the calculated reference distance is the threshold or less for the transmitter of the multiple transmitters having the shortest reference distance to the receiver 20.

Step S405 may be performed similarly to step S205.

Because the information collection system 200 according to the embodiment includes the multiple transmitters, the first display unit 50 can display, in time series, what time the person carrying the receiver 20 started dwelling proximally to which transmitter and about how long the dwell lasted.

In the embodiment, in step S406 after step S404, the information is transmitted from the processor 30 to the second display unit 70; and the display of the information is performed by the second display unit 70. For example, the second display unit 70 is carried by the operator; and the operator can display information relating to the process currently being performed and/or the apparatus being used, information relating to the previous and subsequent processes, etc. In such a case, the second display unit 70 may display the information and display an input form requiring the operator to input information. In such a case, the operator uses the input unit 80 to input the information.

According to the embodiment, compared to the first embodiment, because the information collection system includes the multiple transmitters, the behavior of the possessor of the receiver 20 in the space where the transmitters are provided can be acquired automatically over a wider range.

According to the embodiment, compared to the first embodiment, because the movement path of the possessor of the receiver 20 can be acquired in time series, the behavior of the possessor can be acquired automatically in more detail.

Similarly to the embodiment, the information collection system according to the first embodiment may include the second display unit 70 and the input unit 80.

Modification

In the information collection system 200 according to the second embodiment as well, it is possible to employ a method similar to that of the modification of the information collection system 100 according to the first embodiment. Namely, the processor 30 may determine the average distances $Ad_{10}(t)$, $Ad_{11}(t)$, $Ad_{12}(t)$ and $Ad_{13}(t)$ between the receiver 20 and the transmitters 10 to 13 for the first interval α having the time t as the reference, and may use these average distances as the distances between the receiver 20 and the transmitters 10 to 13.

The average distances $Ad_{10}(t)$ to $Ad_{13}(t)$ respectively are the average distances between the receiver 20 and the transmitters 10 to 13.

When calculating the dwell times of the transmitters 10 to 13, the processor 30 extracts the shortest average distance $Ad_x(t)$ of the average distances $Ad_{10}(t)$ to $Ad_{13}(t)$. The processor 30 determines the time $t_1$ when the shortest average distance $Ad_x(t)$ became the prescribed threshold $d_{th}$ or less, and the time $t_2$ when the average distance $Ad_x(t)$ exceeds the threshold $d_{th}$ after becoming the threshold $d_{th}$ or less. The processor 30 calculates the time difference $t_2-t_1$. Then, the processor 30 uses the time difference as the dwell time of the operator E (the receiver 20) at the location of the transmitter x for which the shortest average distance $Ad_x(t)$ is obtained.

In the case where the signals emitted from the transmitters 10 to 13 include large noise, there is a possibility that the proximity relationship between the receiver 20 and the transmitters 10 to 13 may undesirably reverse temporarily. If the proximity relationship reverses, there is a possibility that the dwell location and/or dwell time of the operator E cannot be determined accurately.

For this aspect, as described above, by using the average distances $Ad_{10}(t)$ to $Ad_{13}(t)$, it is possible to reduce the effects due to the noise and determine the dwell location and/or dwell time of the operator E more accurately.

In such a case, as described in the modification of the first embodiment, the first interval α may be adjusted according to the acceleration sensed by the receiver 20. The average distance $Ad(t_{-1})$ of the first interval α may be calculated using the time $t_{-1}$ before the current time $t_0$ as the reference. Further, the data that includes a large noise component may be removed according to the acceleration and/or velocity of the receiver 20. By using these methods, it is possible to determine the distances between the receiver 20 and the transmitters 10 to 13 even more accurately.

Third Embodiment

An information collection system according to a third embodiment will now be described.

For example, the information collection system according to the third embodiment has a configuration similar to that of the information collection system 200 according to the second embodiment shown in FIG. 7.

In the embodiment, the storage unit 40 stores a behavioral model relating to the state of the possessor of the receiver 20. For example, the behavioral model is modeled as a finite state Markov chain.

Using the information obtained from the receiver 20, the processor 30 estimates the state at the reference time of the possessor of the receiver 20 according to the behavioral model.

For example, in a production site, the possessor of the receiver 20 is an operator; and the state that is included in the behavioral model is the operation performed by the operator.

In such a case, the behavioral model includes the kind of operation performed by the operator and how the operation transitions are modeled.

This will now be described in detail using FIGS. 10A to 10D.

FIGS. 10A to 10D are schematic views showing an example of a behavioral model in a production site.

In the example shown in FIGS. 10A to 10D, the operator that carries the transmitter 20 repeats a series of operations of load, transport, start operation, complete operation, transport, and put in warehouse. At each operation, the probability that the operation is being repeatedly performed and the probability of having transitioned to the next operation after a prescribed unit time has elapsed are included.

Figure 10A:
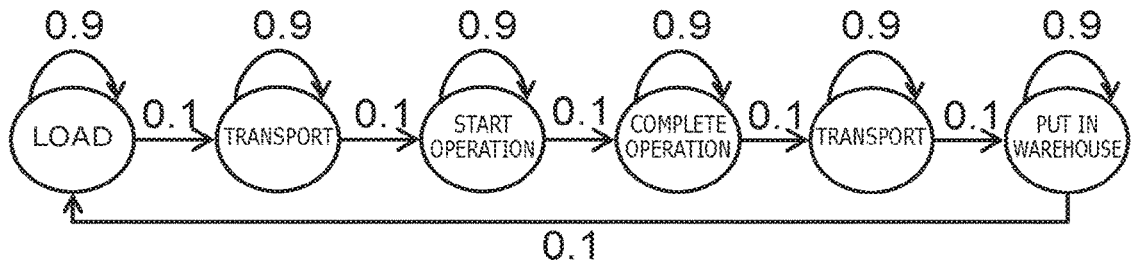
FIGS. 10A to 10D are schematic views showing an example of a behavioral model in a production site.

The example shown in FIG. 10A means that after the unit time has elapsed, the probability of having transitioned to the next operation is 10%; and the probability that the operation is being continued is 90%.

Figure 11:
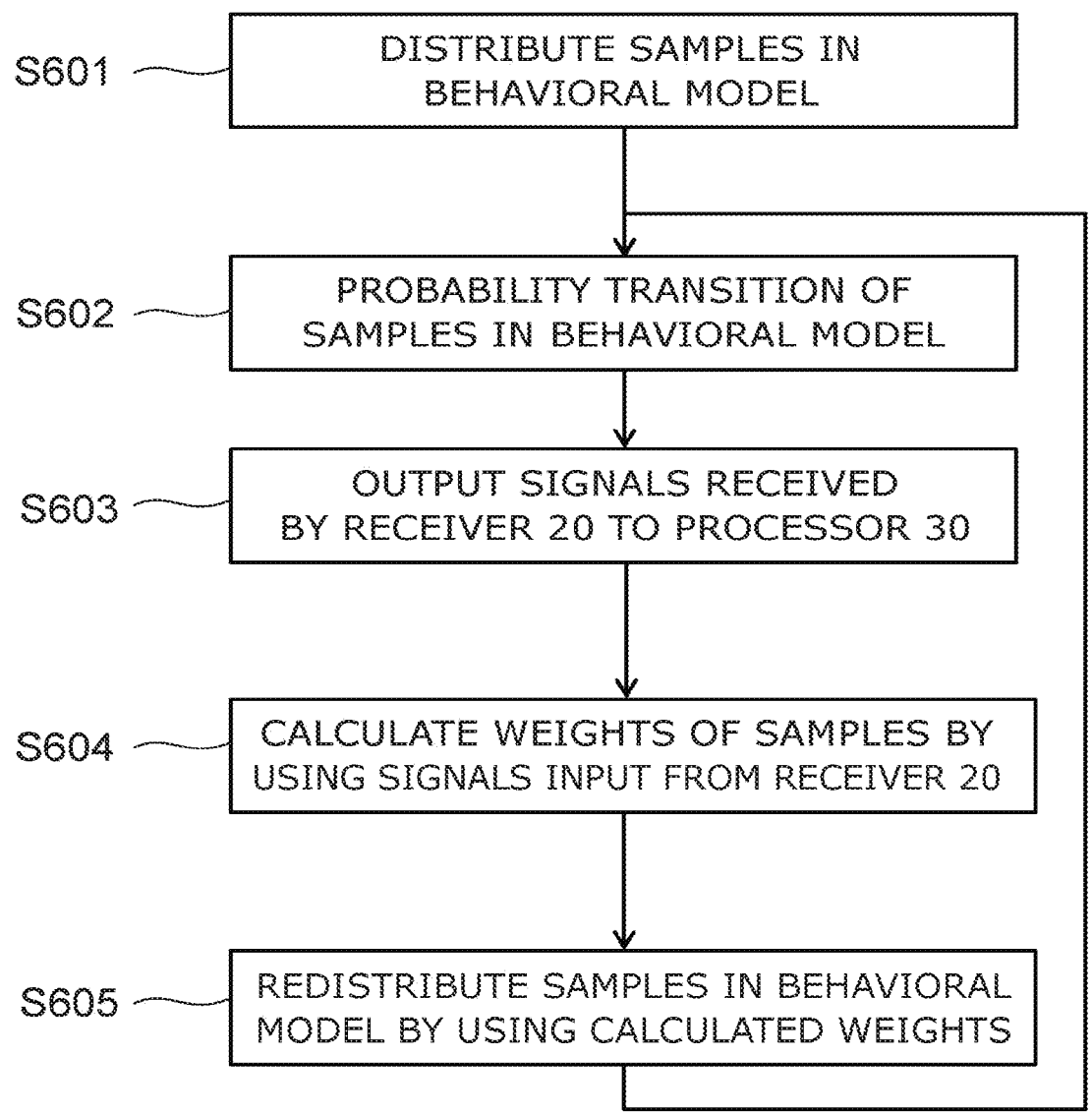
FIG. 11 is a flowchart of a program that executes the information collection system according to a third embodiment.

FIG. 11 is a flowchart of a program that executes the information collection system according to the third embodiment.

First, the processor 30 accesses the storage unit 40 and refers to the behavioral model. The behavioral model that is referred to is designated by the manager of the system. Or, the processor 30 may refer to a behavioral model that includes the process associated with the transmitter emitting the signal when the signal is input from the receiver 20 to the processor 30.

Here, as an example, the processor 30 refers to the behavioral model shown in FIG. 10A.

In step S601, the processor 30 distributes samples in the referred behavioral model. The samples may be distributed uniformly among the operations, or may be distributed randomly among the operations. In such a case, the precision of the estimation can be increased by increasing the number of the distributed samples.

Figure 10B:
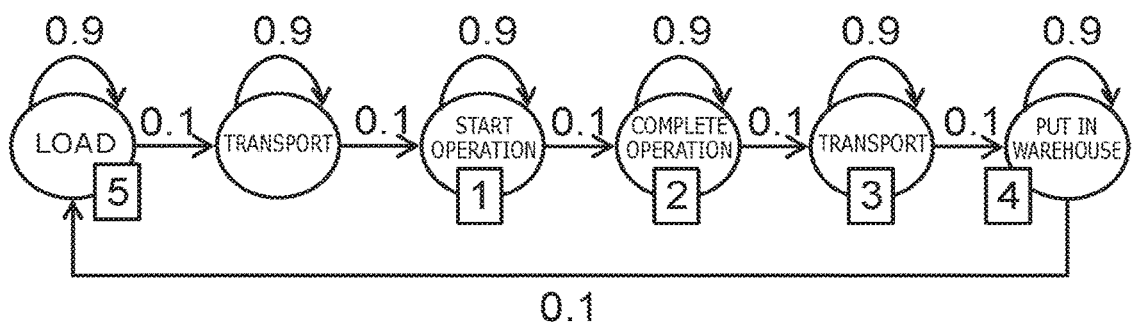

An example of a distribution of the samples in the behavioral model shown in FIG. 10A is shown in FIG. 10B. In the example shown in FIG. 10B, five samples are distributed.

Figure 10C:
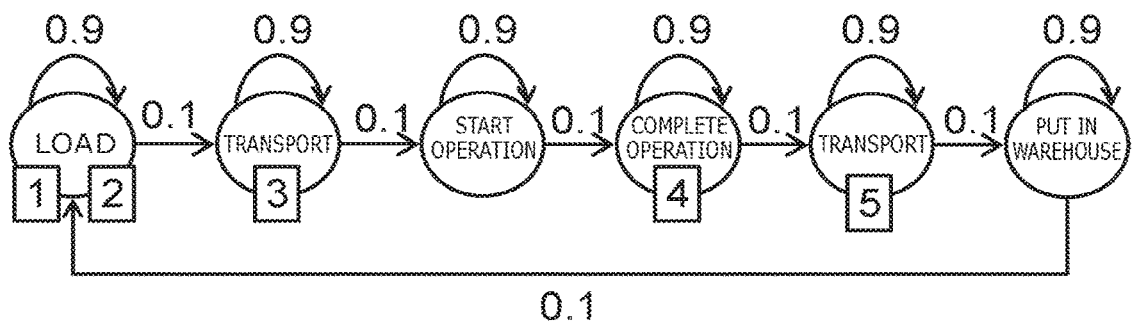

Then, in step S602, the processor 30 performs probability transition of the samples distributed in the behavioral model. As an example, the five samples are distributed in the behavioral model; and FIG. 10C shows an example after performing probability transition of these samples.

Continuing in step S603, the signals that are received by the receiver 20 are output to the processor 30.

Then, in step S604, the processor 30 calculates the weighting coefficient of each sample using the input signals.

In the behavioral model, how strong the signal is and the probability of the signal being input for the transmitters 10 to 13 are included in each state. Therefore, when receiving the signals from the transmitters, the probability of the samples actually being in this state can be calculated.

This will now be described in detail using the example shown in FIG. 11 and FIGS. 12A and 12B.

Figure 12A:
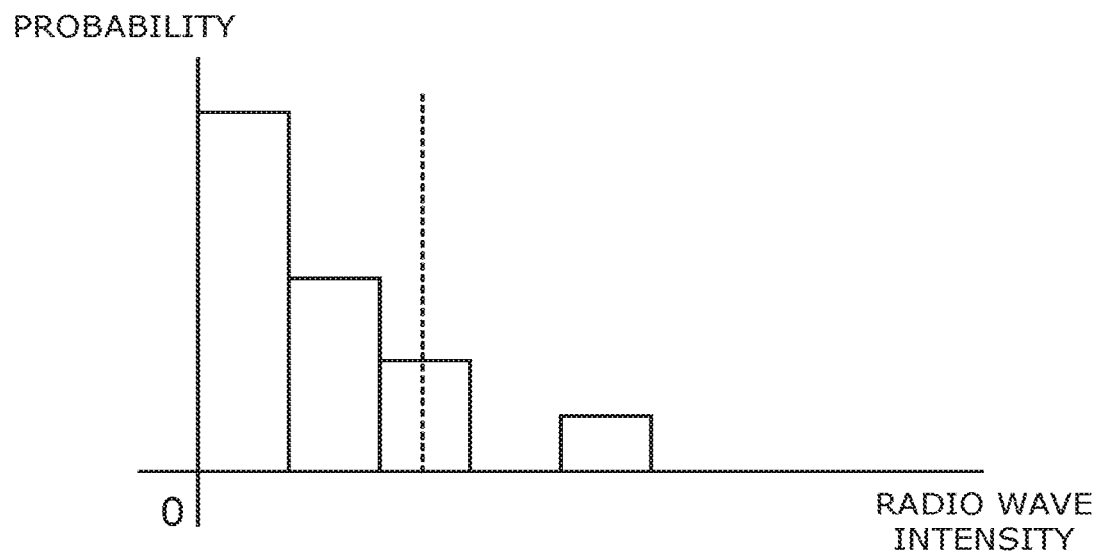
FIGS. 12A and 12B are graphs of examples of relationships between the probability and the signal strength from the transmitter.
Figure 12B:
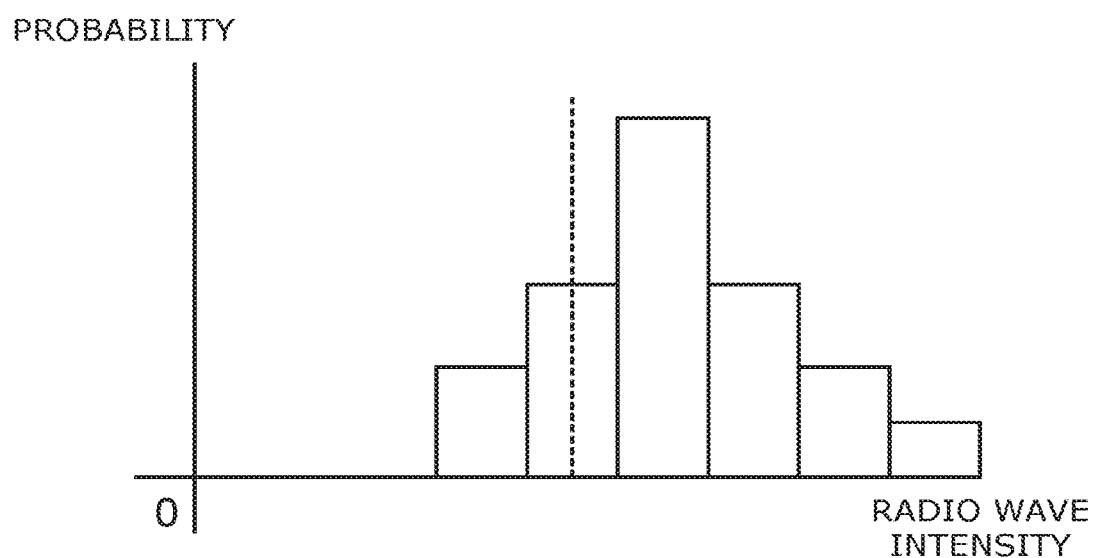

FIGS. 12A and 12B are graphs of examples of relationships between the probability and the signal strength from the transmitter.

For example, as shown in FIGS. 12A and 12B, the behavioral model includes information for the loading operation including the relationship between the probability and the signal strength from the transmitter for each transmitter. FIG. 12A is the relationship between the probability and the signal strength from the transmitter 10; and FIG. 12B is the relationship between the probability and the signal strength from the transmitter 11. Similarly, the behavioral model also includes the relationship between the probability and the signal strength for the transmitters 12 and 13.

For example, in the case where the signal strengths of the signals from the transmitter 10 and the transmitter 11 are shown respectively by the broken lines of FIGS. 12A and 12B, the probability of the signal strength is obtained for each relationship. The signal strength and the probability also are obtained similarly for the transmitters 12 and 13. By calculating the product of these probabilities, the probability of the operator actually being at the operation location of the loading operation is obtained.

In the embodiment, the probability is treated as a weighting coefficient. In the case of the example shown in FIG. 10C, the probabilities that are obtained are used as the weighting coefficients of samples 1 and 2 being in the state of the loading operation.

The weighting coefficients are calculated similarly for each of the samples.

Then, in step S605, the samples are redistributed in the behavioral model by using the calculated weighting coefficients. For example, the weighting coefficient calculated for each sample is multiplied by the number of samples distributed in the behavioral model. Then, the number of samples of the result is disposed at the operation where the samples exist.

Using FIG. 10C as an example, in the case where the weighting coefficients of the samples 1 and 2 are, for example, 0.4 each, the number of samples multiplied by the weighting coefficient is 2.0 for each. If the weighting coefficient of the sample 3 is 0.15 and the weighting coefficients of the samples 4 and 5 are 0.05 each, the products with the number of samples are 0.75, 0.25, and 0.25. At this time, for example, by rounding to the first decimal place, the value of the sample 3 is set to 1; and the other values are set to 0.

Figure 10D:
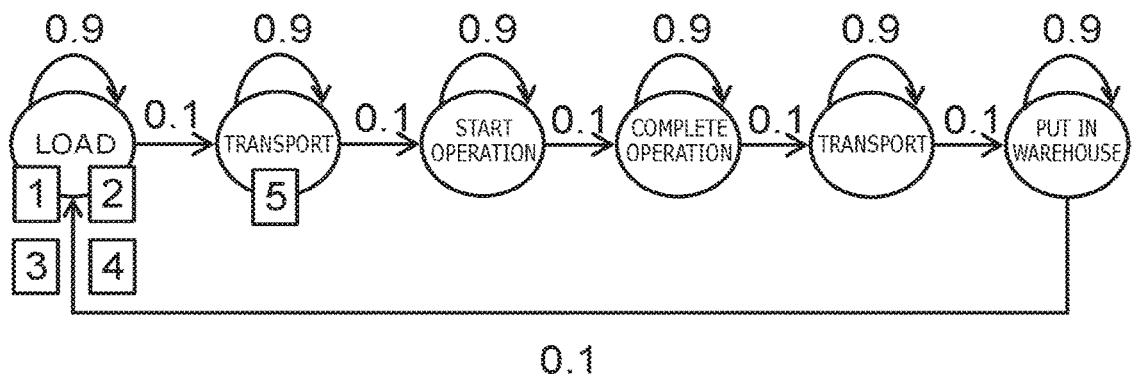

As a result, after resampling in the behavioral model as shown in FIG. 10D, a total of four samples are disposed at the loading process; and one sample is disposed at the transport process. At this time, it can be estimated that the operator is performing the operation where the highest number of samples is distributed.

Subsequently, steps S602 to S605 are repeatedly performed. Thereby, it is possible to estimate which operation has a high likelihood of being performed by the operator at each time. In step S605, the precision can be increased further because the distribution of the samples using the weighting coefficient is repeatedly performed.

For example, the estimation result that is obtained in step S605 may be displayed by the first display unit 50 similarly to step S405. Or, the results that are obtained in each of steps S602 to S605 may be displayed successively by the first display unit 50. The information that is associated with the estimated operation may be displayed by the second display unit 70.

According to the embodiment, the state of the possessor of the receiver 20 according to the behavioral model is estimated using the signals received by the receiver 20. Therefore, the state of the possessor can be determined more accurately even in the case where noise is included in the signals received by the receiver 20, the signals of the transmitters are mixed in the signals received by the receiver 20, etc.

Modification

A modification of the third embodiment will now be described.

In the modification, the storage unit 40 includes a location model in addition to the behavioral model.

The location model includes information such as the positions of the transmitters, the relationship between the signal strength and the distance from the transmitter for each transmitter, etc.

Figure 13:
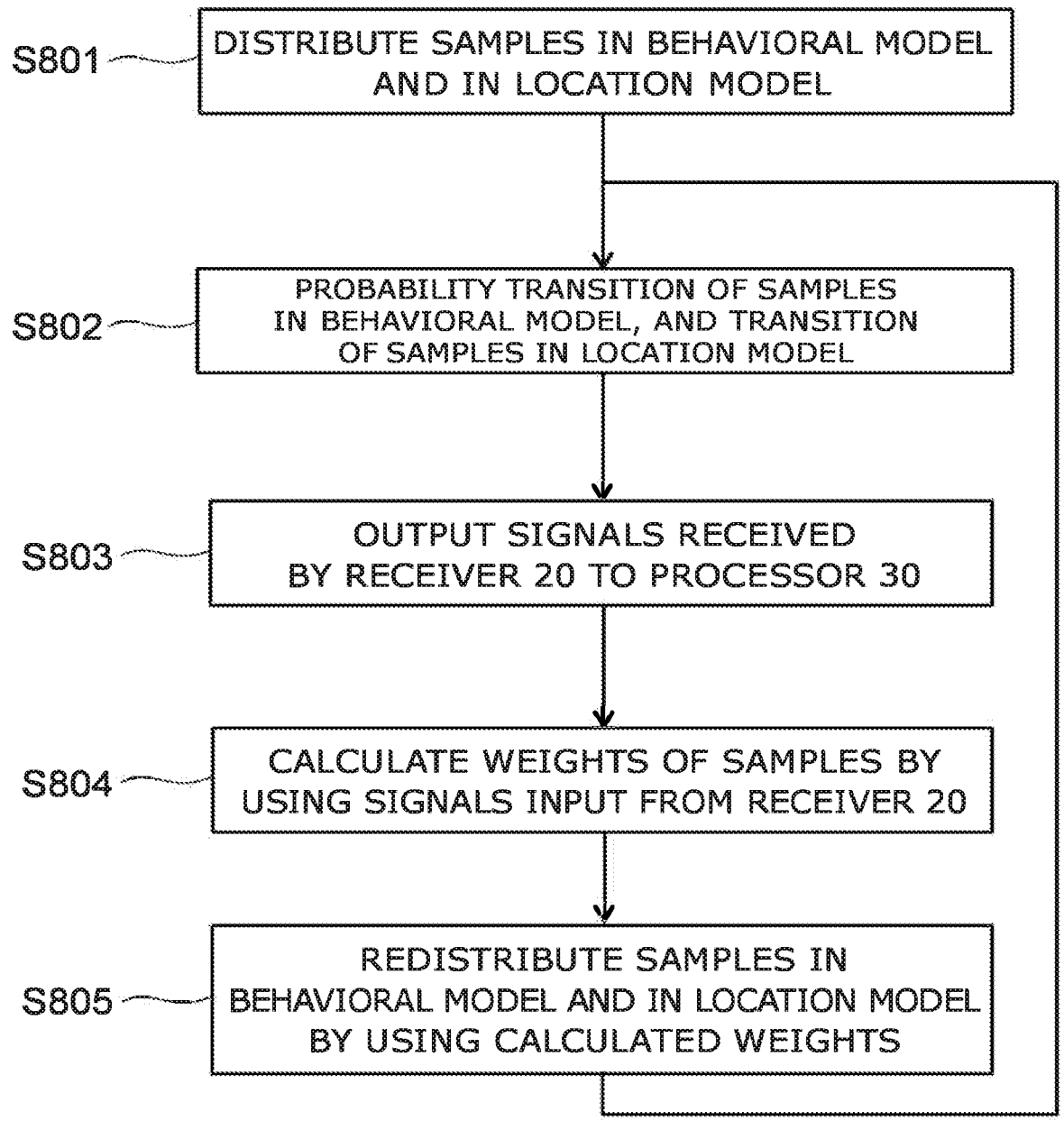
FIG. 13 is a flowchart of a program that executes the information collection system according to the modification of the third embodiment.

FIG. 13 is a flowchart of a program that executes the information collection system according to the modification of the third embodiment.

First, the processor 30 accesses the storage unit 40 and refers to the prescribed behavioral model and location model.

In step S801, the processor 30 distributes the samples in the referred behavioral model and location model. The samples may be distributed uniformly in the models; or the samples may be distributed randomly. In such a case, the precision of the estimation can be increased by increasing the number of the distributed samples.

Figure 14A:
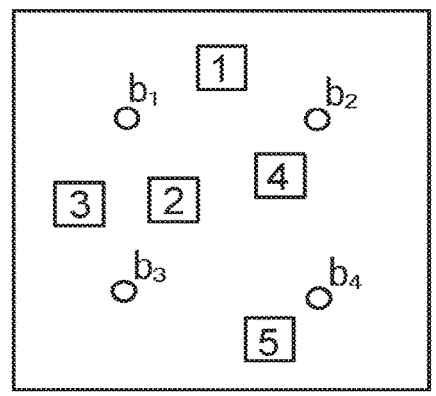
FIG. 14A is an example of the location model in which the samples are distributed.
Figure 14B:
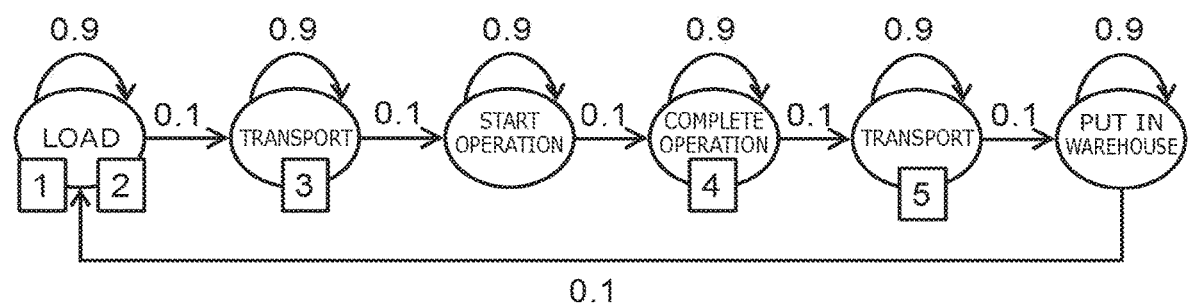
FIG. 14B is an example of the behavioral model in which the samples are distributed.

One specific example after performing step S801 is shown in FIGS. 14A and 14B. FIG. 14A is an example of the location model in which the samples are distributed; and FIG. 14B is an example of the behavioral model in which the samples are distributed. At this time, there is a correspondence between the samples distributed in the behavioral model and the samples distributed in the location model. For example, state sample 1 that is distributed in the behavioral model corresponds to position sample 1 that is distributed in the location model.

Then, in step S802, the processor 30 causes the samples distributed in the behavioral model and in the location model to transition. As described above, probability transition of the samples in the behavioral model is performed every unit time. On the other hand, in the location model, for example, the samples perform a random walk every unit time.

Then, in step S803, the signals that are received by the receiver 20 are output to the processor 30.

Continuing in step S804, the processor 30 calculates the weighting coefficient of each sample by using the input signals.

As described above, the behavioral model includes how strong the signal is from each transmitter and at about what probability is the signal being received from each transmitter when performing each operation. The location model includes information of the positions of the transmitters and the relationship between the signal strength and the distance from the transmitter for each transmitter.

Therefore, when receiving the signals from the transmitters, the probability of the possessor of the receiver 20 actually being in this state and the probability of the possessor of the receiver 20 actually being at the location can be calculated for each of the samples.

Figure 15A:
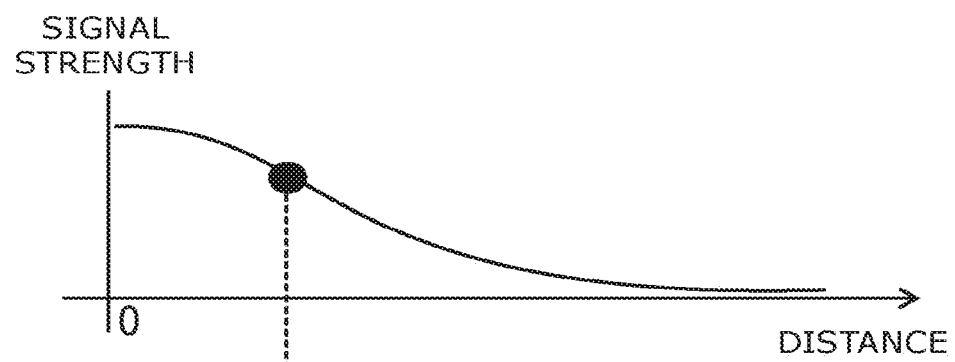
FIG. 15A is a graph of an example of the relationship between the distance between the transmitter and the sample and the signal strength measured at the distance.
Figure 15B:
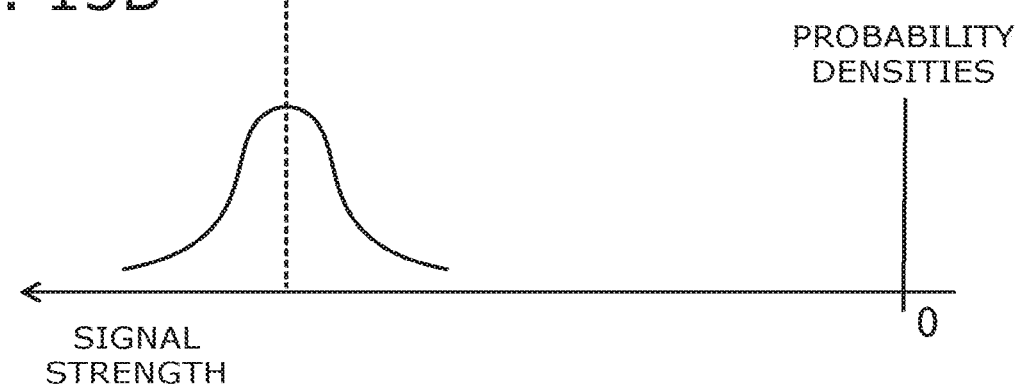
FIG. 15B is a graph of the relationship between the signal strength received by the receiver and the probability of the sample actually being at the location for the example of FIG. 15A.

Specifically, FIGS. 15A and 15B are described as an example.

FIG. 15A is a graph of an example of the relationship between the distance between the transmitter 10 and the sample and the signal strength measured at the distance. FIG. 15B is a graph of the relationship between the signal strength received by the receiver 20 and the probability of the sample actually being at the location for the example of FIG. 15A.

In FIG. 15A, the vertical axis is the signal strength; and the horizontal axis is the distance. In FIG. 15B, the vertical axis is the probability density; and the horizontal axis is the signal strength.

In the case where a sample exists at the position of the dark spot of FIG. 15A, the probability of the sample actually being at the location can be expressed as a normal distribution having a peak at the position of the dark spot of FIG. 15A as shown in FIG. 15B.

In the example shown in FIGS. 15A and 15B, in the case where the signal strength from the transmitter 10 received by the receiver 20 is the strength illustrated by the double dot-dash line of FIG. 15B, the probability of the operator actually being at the position of the sample is obtained from the probability distribution of FIG. 15B.

Similarly, the probability of the operator actually being at the position of the sample is determined for all of the other transmitters by using the signal strength from the transmitter.

Subsequently, by multiplying together all of the obtained probabilities, the probability due to the location model of the operator actually being at the position of the sample is obtained.

On the other hand, the probabilities in the behavioral model are obtained by a method similar to the method described in reference to step S604.

Finally, the probability of the operator actually performing the operation of the sample at the position of the sample is obtained by multiplying the probability obtained from the location model and the probability obtained from the behavioral model.

This is performed for all of the samples; and the weighting coefficient of each sample is obtained.

Then, in step S805, the samples are redistributed in the behavioral model and in the location model by using the calculated weighting coefficients by a method similar to that of step S605.

According to the modification, the state and position of the possessor of the receiver 20 are estimated according to the location model in addition to the behavioral model. It is possible to determine the state and position of the possessor more accurately.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. An information collection system, comprising:
a plurality of transmitters emitting signals;
a receiver configured to receive the plurality of signals emitted from the plurality of transmitters;
processing circuitry, the plurality of signals received by the receiver being input to the processing circuitry,
wherein the processing circuitry is further configured to
refer to a behavioral model, the behavioral model including a plurality of states and a transition probability between the plurality of states, the plurality of states being of a possessor of the receiver in a space where the plurality of transmitters is provided,
distribute a plurality of state samples of the possessor in the behavioral model, each of the plurality of state samples indicating one of the plurality of states,
perform a probability transition of the plurality of state samples in the behavioral model every unit time,
refer to a location model different from the behavioral model the location model including a plurality of positions in the space,
distribute a plurality of position samples in the location model, the plurality of position samples respectively corresponding to the plurality of state samples,
transition the plurality of position samples in the location model every unit time,
redistribute the plurality of state samples in the behavioral model and redistribute the plurality of position samples in the location model by using the plurality of state samples transitioned in the behavior model, the plurality of position samples transitioned in the location model, aid the plurality of signals, and
estimate the state of the possessor and the position of the possessor in the space based on the result of the redistribution of the plurality of state samples and the result of the redistribution of the plurality of position samples.

2. The system according to claim 1, wherein
the behavioral model further includes, for each of the plurality of transmitters at each of the states, strengths of the signals from the plurality of transmitters and probabilities of obtaining the strengths, and the processing circuitry is further configured to determine the probability for the signal from one of the transmitters for each of the transmitters and redistribute the plurality of state samples in the behavioral model by using a weighting coefficient obtained from a product of the plurality of probabilities.

3. The system according to claim 1, wherein
the location model further includes information of a relationship between a strength of the signal and a distance from one of the transmitters for each of the plurality of transmitters,
the processing circuitry is further configured to determine, based on a position in the space of one of the plurality of position samples, a relationship between the signal strength and a probability of the signal strength at the position for each of the transmitters,
the processing circuitry is further configured to determine a probability of the one of the plurality of position samples existing at the position by using the relationship and the strength of the signal input from the receiver for each of the transmitters,
the processing circuitry is further configured to calculate a product of a plurality of the probabilities for the one of the plurality of position samples, wherein the product is calculated for each of the plurality of position samples,
the processing circuitry is further configured to calculate a weighting coefficient using a product of the plurality of probabilities obtained from the behavioral model and a product of the plurality of probabilities obtained from the location model, wherein the weighing coefficient is calculated for each state sample of the plurality of state samples and a corresponding position sample of the plurality of position samples, and
the processing circuitry is further configured to redistribute the plurality of position, samples in the location model by using the weighting coefficients.

4. The system according to claim 1, wherein one of the transmitters is a beacon.

5. The system according to claim 1, wherein
one of the transmitters is a radio frequency identifier (RFID), transmitter, and
the receiver is an RF reader.

* * * * *

UNITED STATES PATENT AND TRADEMARK OFFICE
CERTIFICATE OF CORRECTION

| | | |
|---|---|---|
| PATENT NO. | : 11,579,276 B2 | Page 1 of 1 |
| APPLICATION NO. | : 16/875434 | |
| DATED | : February 14, 2023 | |
| INVENTOR(S) | : Yasuo Namioka et al. | |

It is certified that error appears in the above-identified patent and that said Letters Patent is hereby corrected as shown below:

On the Title Page

Item (30), the Foreign Application Priority Data should read:
-- (30) Foreign Application Priority Data
August 3, 2015 (JP) ..................... 2015-153596
June 15, 2016 (JP) ..................... 2016-119086 --

Signed and Sealed this
Twenty-fourth Day of September, 2024

Katherine Kelly Vidal
*Director of the United States Patent and Trademark Office*